United States Patent [19]

Nishikawa

[11] 4,272,656
[45] Jun. 9, 1981

[54] QUASI-RESISTIVE BATTERY FEED FOR TELEPHONE CIRCUITS

[75] Inventor: Yukio Nishikawa, San Jose, Calif.

[73] Assignee: Precision Monolithics, Inc., Santa Clara, Calif.

[21] Appl. No.: 27,503

[22] Filed: Apr. 5, 1979

[51] Int. Cl.³ .............................................. H04B 1/58
[52] U.S. Cl. ................................ 179/170 NC; 179/70
[58] Field of Search ............. 179/16 A, 16 AA, 16 F, 179/18 FA, 70, 77, 170 NC, 170 T

[56] References Cited

U.S. PATENT DOCUMENTS

| | | | |
|---|---|---|---|
| 3,700,831 | 10/1972 | Agaard et al. | 179/170 NC |
| 3,849,609 | 11/1974 | Voorman | 179/170 NC |
| 3,916,110 | 10/1975 | Lee et al. | 179/16 F |
| 4,004,109 | 1/1977 | Boxall | 179/170 NC |
| 4,041,252 | 8/1977 | Cowden | 179/170 NC |
| 4,086,447 | 4/1978 | Schindler et al. | 179/170 NC |
| 4,142,075 | 2/1979 | Olschewski | 179/16 F |

*Primary Examiner*—Robert S. Tupper
*Assistant Examiner*—Randall P. Myers
*Attorney, Agent, or Firm*—Richard S. Koppel

[57] ABSTRACT

An electronic circuit simulates the direct current characteristics of the hybrid transformer portion of the telephone system call-handling equipment. The circuit is connected across a two-wire telephone subscriber loop and supplies a loop current that is proportional to the difference between a constant current and a reference current. The circuit contains a voltage sensing circuit which senses the voltage across the loop and transfers the sensed voltage across a reference resistor, thereby developing a reference current through the resistor which is proportional to the voltage across the subscriber loop. An integral current generator supplies a constant current to the circuit. An integral current subtractor, connected between the output of the voltage sensing circuit and the current generator subtracts the constant current from the reference current. The resulting current forms the input current to an integral current amplifier. The current amplifier amplifies the current from the current subtractor, thereby producing an amplified current which is proportional to the reciprocal of a constant plus the resistance of the subscriber loop. The current supplied the loop by the circuit is the output current from the current amplifier. The electronic circuit forms part of a larger integrated circuit which is a complete replacement for the hybrid transformer.

9 Claims, 10 Drawing Figures

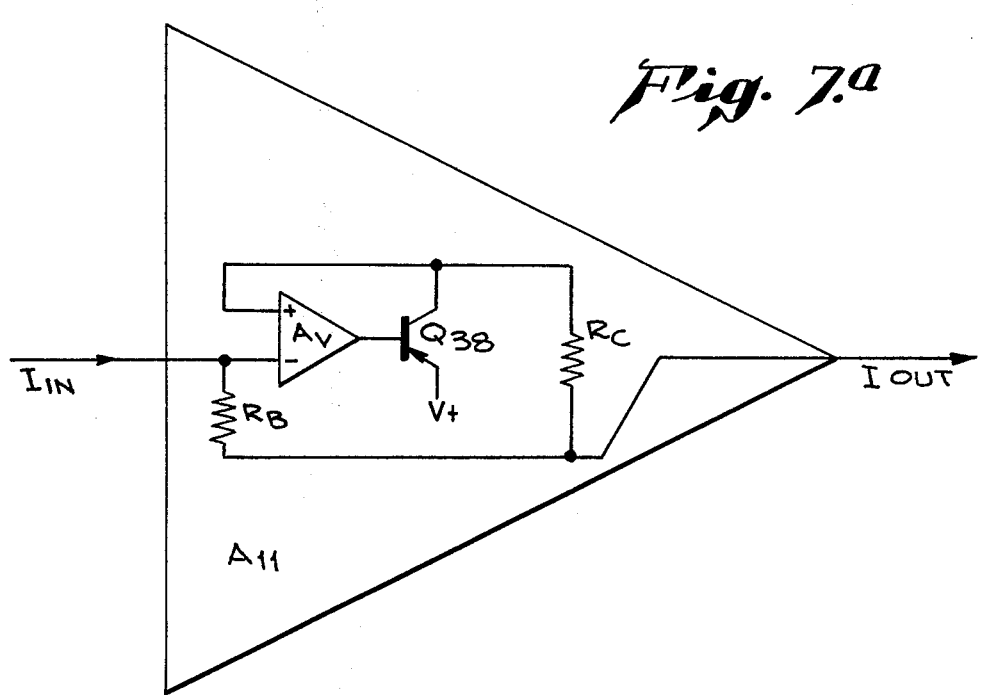
Fig. 7.a
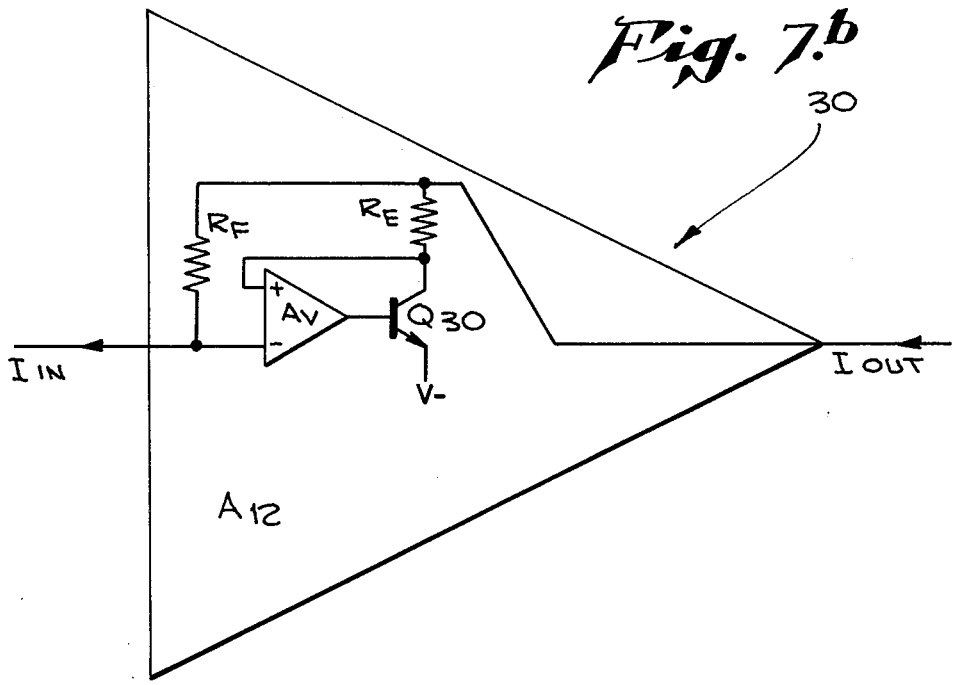
Fig. 7.b

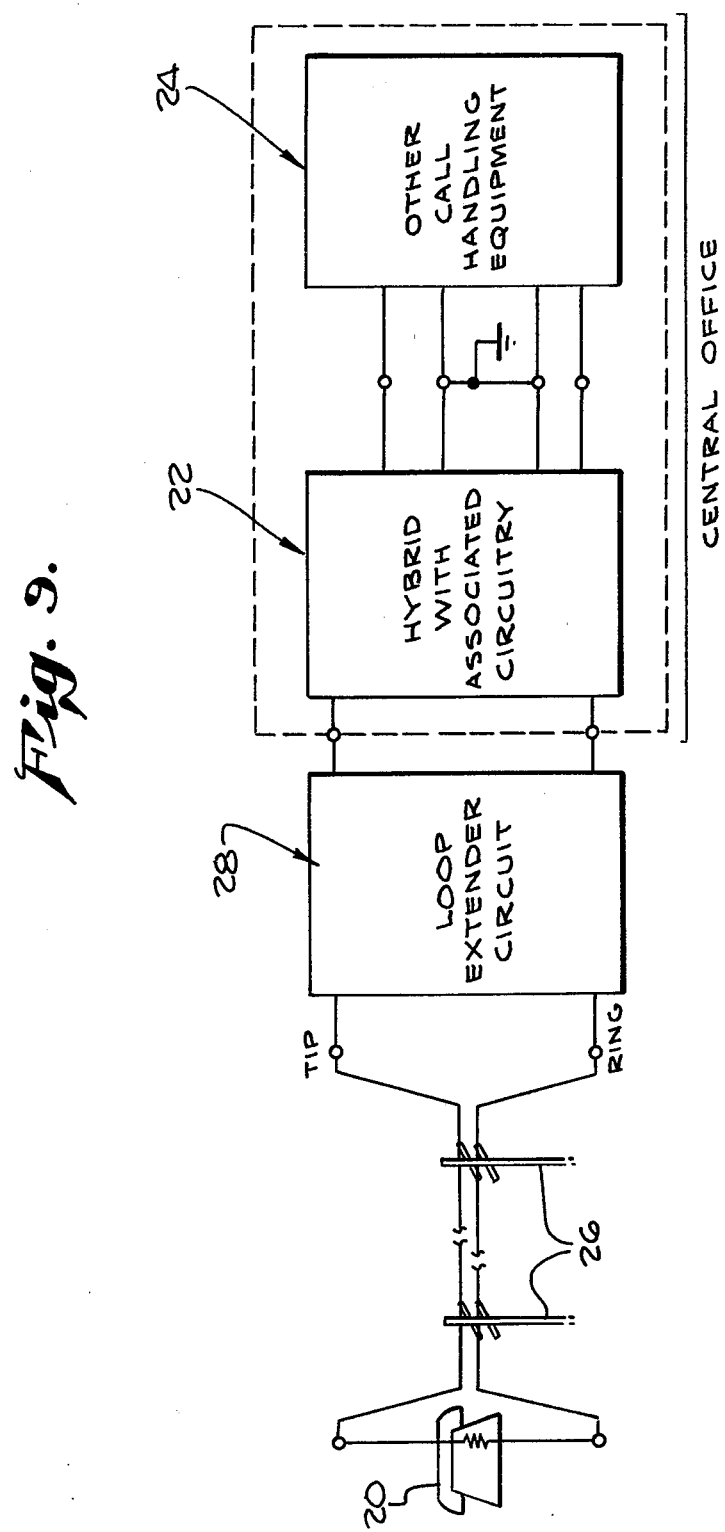

QUASI-RESISTIVE BATTERY FEED FOR TELEPHONE CIRCUITS

FIELD OF THE INVENTION

This invention relates to active electronic circuitry which simulates the direct current characteristics of passive electronic devices.

BACKGROUND OF THE INVENTION

DC power is used to power both the audio and the signalling circuit extending between a subscriber's telephone and the Central Office call-handling equipment in the telephone system. In such systems, a modulated DC current carries the voice messages that pass over the telephone lines. The use of DC current is a carry over from the first telephone systems which utilized batteries to supply the necessary current to energize the telephone lines. In the telephone systems in use today, AC power is converted to DC power to energize the telephone lines, and DC batteries are used only in a backup capacity for the AC power source. However, the technique of energizing the telephone lines with DC power is still referred to as "battery feed."

The interface between a telephone subscriber and the Central Office in most telephone systems is a magnetic hybrid transformer. As the telephone system call handling equipment uses separate wires for the receive and transmit signals, and as a combined received and transmit signal is sent to the telephone subscriber on a two wire "loop," the magnetic hybrid transformer provides the 2:4 wire conversion between the telephone and the Central Office call handling equipment. Additionally, the magnetic hybrid transformer supplies the telephone lines with the DC power. Of these two functions, the 2:4 wire conversion is the one around which the magnetic hybrid transformer was designed. The battery feed function was adapted to work with the magnetic hybrid transformer.

The magnetic hybrid transformer is an entirely passive device utilizing coils of wire wound about a magnetic core. With the increasing integration of many of the elements in a telephone system into small electronic circuits, the magnetic hybrid transformer is an attractive candidate for which an integrated circuit replacement would be desirable. Several configurations utilizing integrating circuits persently exist to implement the 2:4 wire conversion property of the magnetic hybrid transformer. However, previous attempts to integrate into these chips the battery feed function have met with less than total success.

The problems encountered by previous attempts to integrate both the battery feed and 2:4 wire conversion in an integrated circuit arise from the fact that the battery feed function is a purely DC characteristic, and the 2:4 wire conversion process is entirely an AC function. Great difficulty has arisen in implementing these dual functions in a single integrated circuit. Additionally, the telephone system has a standard AC impedance. This impedance also must be implemented along with the battery feed, and 2:4 wire conversion features. The combining of these three features has presented insurmountable problems in the previous attempts to integrate them into a single circuit.

Another difficulty in integrating the magnetic hybrid transformer arises from the fact that the telephone system utilizes special amplification circuitry to service those telephone subscribers located far from the Central Office. These special amplification circuits are called loop extenders. The loop extender is basically a current amplifier which utilizes the amount of DC current on the line to control the degree of AC amplification of the combined transmit and receive signals. Even those previous attempts to integrate all of the functions of the magnetic hybrid transformer into a single chip which have been partially successful have not managed to operate in a compatible fashion with the loop extender circuitry.

Accordingly, it is the principal object of this invention to simulate the DC characteristics of the magnetic hybrid transformer.

It is a further object of this invention to simulate the direct current characteristics of the magnetic hybrid transformer in a manner which will allow a single integrated electronic circuit to provide both the battery feed and 2:4 wire conversion functions of the magntic hybrid transformer.

It is a final object of this invention to achieve compatibility of an active circuit replacement for the magnetic hybrid transformer with the loop extender circuitry used in the telephone system.

SUMMARY OF THE INVENTION

The present invention, in one embodiment, provides a circuit which supplies a loop current to a telephone subscriber loop. The voltage across the subscriber loop is sensed and a control signal proportional to the sensed voltage is developed. The loop current is made equal to a predetermined current reduced by a current proportional to the control signal and is thereby proportional to the reciprocal of a constant plus the loop resistance. The circuit therefore completely simulates the direct current characteristics of a telephone hybrid circuit and the associated subscriber loop.

In accordance with one feature of the invention, a current amplifier connected to the telephone subscriber loop supplies the loop current. A voltage sensing circuit is connected across the telephone subscriber loop and senses the voltage across the loop. The sensed voltage is applied across a reference resistor, the resulting current through the resistor being proportional to the voltage across the subscriber loop. Additionally, a constant current generator is used for supplying a fixed current. A current substractor is connected to the outputs of the voltage sensing circuit and the constant current generator and to the input of the current amplifier. The current subtractor circuit subtracts the constant current from the current generator from the reference current through the resistor, and the resulting current forms the input to the current amplifier. The output of the current amplifier is an amplified current which is proportional to the reciprocal of a constant plus the resistance of the subscriber loop.

In accordance with another feature of the invention, the circuit that senses the voltage across the subscriber loop utilizes a simplified circuit configuration containing two unity gain voltage buffers and a resistor connected across the output of the buffers. The unity gain voltage buffers each exhibit a high input impedance and a low output impedance and draw no current from the subscriber loop. The resistor connected across the output of the two voltage buffers has the current produced in it that is proportional to the voltage across the subscriber loop.

In accordance with another feature of the invention, the current subtractor utilizes a pair of current mirrors. The current mirror configuration facilitates each implementation of a current subtractor in an integrated circuit as very few components are required. These current mirrors are connected to the current passing through the resistor connected across the output of the voltage buffers in the voltage sense circuit and the current from the constant current generator. The output of the current subtractor is the difference between the constant current from the current generator and the reference current from the resistor. This circuit is then amplified to produced a current proportional to the reciprocal of a constant resistance plus the resistance of the subscriber loop. It is this characteristic which is the DC characteristic of the magnetic hybrid transformer.

In accordance with still another feature of the invention, a controlled current generator is utilized on the opposing side of the telephone subscriber loop from the current amplifier. This current generator injects a current into the subscriber loop in a manner which causes the voltage present at one side of the loop to track the voltage present at the other side of the loop. This generator is utilized in conjunction with the current amplifier to ensure that sufficient current is supplied to the telephone subscriber loop to allow the DC characteristics of the magnetic hybrid transformer to be completely followed.

In accordance with a final feature of the invention, the resulting integrated circuit, into which the circuit simulating the direct current characteristics of the magnetic hybrid transformer is integrated, forms a complete replacement for the magnetic hybrid transformer. The integrated circuit simulates the battery feed function, the 2:4 wire conversion function, and the AC impedance function. Additionally, the resulting circuit is completely compatible with the loop extenders utilized by the telephone company.

Other objects, features and advantages of the present invention will become apparent from a consideration of the following detailed description and from the accompanying drawings.

BRIEF DESCRIPTION OF THE DRAWINGS

FIGS. 7(a) and 7(b) are schematic diagrams of the current amplifier portions of FIG. 6 and FIG. 8;

FIG. 9 is a block diagram showing the positioning of a loop extender circuit in the block diagram of FIG. 1.

DETAILED DESCRIPTION

Figure 1:
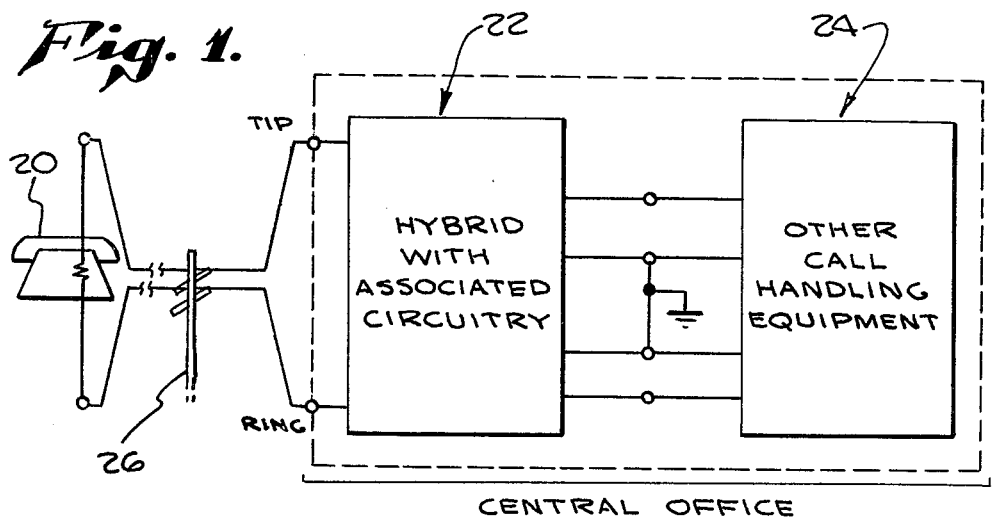
FIG. 1 is a block diagram of a typical telephone system showing the positioning of a magnetic hybrid transformer or an electronic equivalent thereof within the system.

Referring more particularly to the drawings, FIG. 1 shows a block diagram of the subscriber portion of the telephone system between the subscriber and the Central Office. As mentioned above, conversations pass between the telephone 20 and the Central Office by means of DC power. That is, the voice messages are carried to and from the telephone 20 by means of a modulated DC current. The use of a DC current is a holdover from the first telephone systems which utilized batteries to supply the necessary current to the telephone. Today, the Central Office converts AC power to DC power for energizing the telephone 20 and the telephone lines 26. Even though DC batteries are only used in a backup capacity for the AC power source, the technique of energizing the telephone lines 26 with DC power is still referred to as "battery feed."

As FIG. 1 shows, the connection of the telephone 20 to the Central Office is through a hybrid circuit 22. This circuit 22 may be a Magnetic Hybrid Transformer (MHT) or an electronic equivalent thereof. The hybrid provides two basic functions. First, it supplies the telephone lines 26 with DC power (battery feed). Second, it provides the 2:4 wire conversion between the telephone 20 and the Central Office call-handling equipment 24 and the 4:2 wire conversion between the call-handling equipment 24 and the telephone 20.

Regarding the 2:4 wire conversion, the telephone 20 can be viewed as a resistive element at the end of loop formed with the Central Office. The transmit signal from the telephone 20 and the receive signal to the telephone 20 are carried in a combined fashion on the two-wire "loop." By contrast, the Central Office call-handling equipment 24 utilizes separate transmit and receive signals, necessitating four wires. The four wires consist of a separate transmit and receive wire with common ground. Thus, a conversion is necessary for a signal travelling in either direction.

Figure 2:
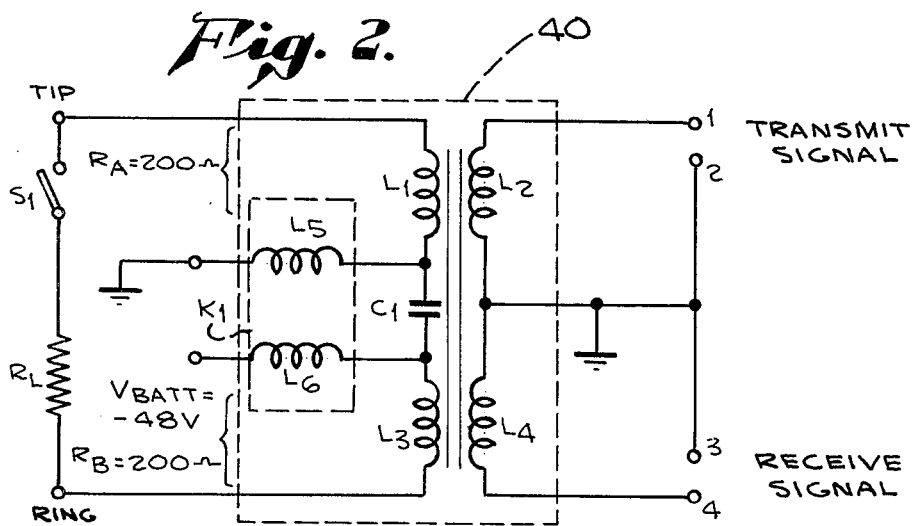
FIG. 2 is a schematic diagram of the magnetic hybrid transformer typically utilized in the system shown in FIG. 1.

FIG. 2 shows a schematic diagram of a MHT 40 typically utilized in FIG. 1. A MHT differs from other transformers in that it has four separate windings connected as shown in FIG. 2. The magnetic coupling capability of the transformer allows the proper 2:4 wire conversion to be performed. The 2:4 wire conversion process results in both the receive and transmit signals being present across the ring and tip terminals of the subscriber loop and the receive and transmit signals being separated in the Central Office, at terminals 3 and 4 and 1 and 2, respectively. The ring and tip terminals are the technical labels for the two ends of the subscriber loop connected to the Central Office, and are derived from the old manual switchboard plug and jack arrangements. Of two functions performed by the hybrid 22, the 2:4 wire conversion is the primary one. Consequently, the battery feed function is adapted to the MHT to work in conjunction with the 2:4 wire conversion function.

The adaptation of the battery feed function for the MHT 40 is done through use of a relay $K_1$, which is an integral part of the MHT 40, and by switch $S_1$, which functionally is the cradle switch on the telephone. When the handset of the telephone is lifted off of the cradle, the subscriber's request for service is detected by the closing of switch $S_1$. The closure of switch $S_1$ places current through the coils of relay $K_1$, thereby causing the relays to close and a dial tone to be supplied to the subscriber.

The amount of current drawn by the telephone is a function of the resistance of the MHT 40, the telephone lines, and the telephone instrument. These resistances can be grouped into two categories: (1) the combined resistance of the telephone instrument and the telephone lines, referred to as $R_L$ in FIG. 2; and (2) the combined resistance of the winding coil $L_1$ and the relay coil $L_5$, referred to as $R_A$, and the combined resistance of winding coil $L_3$ and relay coil $L_6$, referred to as $R_B$.

The DC resistance of the telephone instrument 20 itself does not change. However, the resistance of the telephone lines 26 increases as the length of the line increases. Thus, the further a subscriber's telephone from the Central Office, the higher is the value of $R_L$. The combined resistance $R_A$ of winding coil $L_1$ and its associated relay coil $L_5$ is 200 ohms. The same holds true for the combined resistance $R_B$ of coils $L_3$ and $L_6$. The sum of $R_A$ and $R_B$, referred to as $R_F$, is therefore 400 ohms. Consequently, the total resistance of the "loop" formed by $R_L$ and $R_F$ is the quantity $(R_L+400)$ ohms. The Bell Telephone System has adopted the 400 ohm battery feed as a standard method of supplying DC power to its subscribers.

Figure 3:
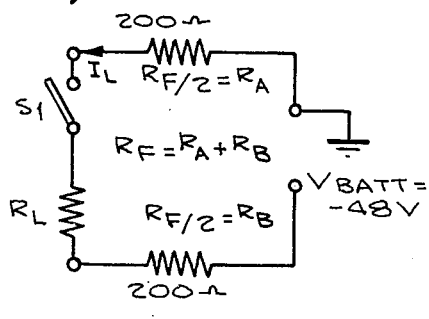
FIG. 3 is a direct current equivalent circuit of the magnetic hybrid transformer shown in FIG. 2.

The DC equivalent of the circuit shown in FIG. 2 is shown in FIG. 3. In this circuit, resistances $R_F/2$ have replaced resistances $R_A$ and $R_B$ in FIG. 2. The DC supply voltage $V_{BATT}$ is $-48$ volts in FIGS. 2 and 3. As a result, the amount of current drawn by resistance $R_L$ is thus the total loop resistance $(R_L+R_F)$ divided into the battery voltage ($V_{BATT}$). The equation for the loop current $I_L$ of FIG. 3 is:

$$I_L = \frac{V_{BATT}}{(R_F + R_L)} = \frac{-48 \text{ volts}}{(R_L + 400) \text{ohms}}. \quad (1)$$

Figure 4:
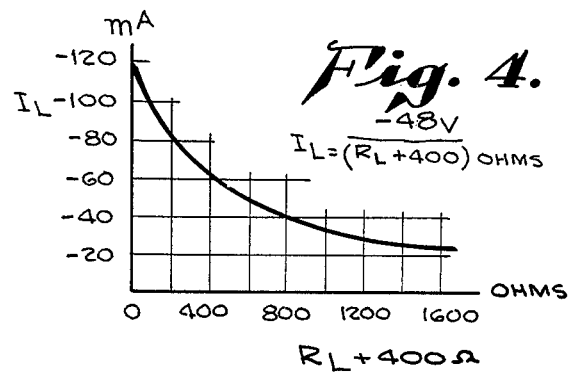
FIG. 4 is the current versus resistance characteristics of the circuit shown in FIG. 3.

FIG. 4 shows a graph of the loop current $I_L$ against the total loop resistance ($R_L+400$ ohms) for the circuits of FIGS. 2 and 3. As resistance ($R_L+400$ ohms) increases, less current $I_L$ is supplied to the loop and, in the absense of special equipment such as line extenders, it becomes more difficult to hear a remote subscriber.

FIGS. 3 and 4 are directed solely to the DC characteristics of the MHT 40. As any transformer is also an AC impedance converter, the MHT also has certain AC characteristics. Specifically, the turns ratio of windings $L_1$ through $L_4$ determine the ratio of the impedance on either side of the MHT 40. For use in the telephone system, the MHT 40 is wound so that it has an AC impedance of either 600 or 900 ohms. However, as the present invention is solely directed at developing a circuit which will simulate the DC characteristics of the MHT 40, neither the AC characteristics, nor the 2:4 wire conversion functions of the MHT are considered hereinafter in detail. The present invention is intended to be part of a larger integrated electronic circuit which will be a complete replacement for the MHT 40 and which will implement the appropriate AC characteristics and the 2:4 conversion function.

Figure 5:
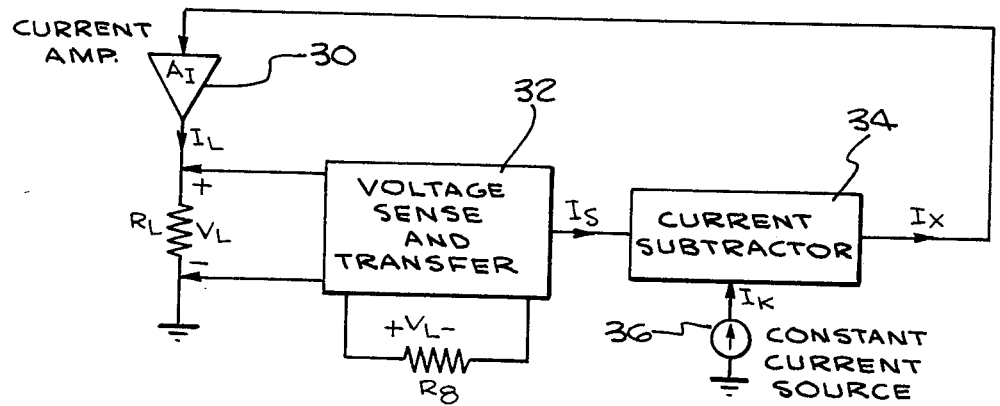
FIG. 5 is a functional block diagram illustrating the principles of the present invention.

FIG. 5 shows a functional block diagram illustrating the principles of the present invention. This invention is referred to as a Quasi-Resistive Battery Feed, as it electronically appears to be the 400 ohm resistive battery feed created by the MHT 40. The invention is a current generator circuit which produces an output current $I_L$ in a manner that duplicates the $I_L$ versus $R_L$ characteristics shown in FIG. 4 for the circuit of FIG. 3. Since it is a current generator that is supplying the loop current $I_L$ and since current generators typically have high DC output impedances, the desired AC signal impedance characteristics of the MHT 40 can be separately set in the larger circuit wherein this circuit is located.

The basic operation of the functional blocks shown in FIG. 5 is as follows. A Voltage Sense and Transfer Circuit 32 senses the voltage $V_L$ across resistance $R_L$, which is the resistance of the telephone lines 26 and telephone apparatus 20. The voltage $V_L$ sensed across resistance $R_L$ is transferred by this circuit 32 across an internal resistor $R_8$. The Voltage Sense and Transfer Circut 32 has a very high input impedance, thereby drawing no current away from resistance $R_L$. The Voltage Sense and Transfer Circuit 32 generates output current $I_S$, whose value is given by the following formula:

$$I_S = V_L/R_8. \quad (2)$$

Current $I_S$ then flows into a Current Subtractor Circuit 34. Also flowing into the Current Subtractor Circuit 34 is the output $I_K$ of a Constant Current Source 36. The Current Subtractor 34 generates the difference between current $I_S$ and current $I_K$. The output of the Current Subtractor Circuit 34 is current $I_X$, whose value is given as follows:

$$I_X = I_K - I_S = I_K - (V_L/R_8). \quad (3)$$

The output current of the Current Subtractor Circuit 34 is fed to a Current Amplifier Circuit 30. The output of the Current Amplifier 30 is the input current $I_X$ times an amplification factor $A_I$. The output of the Current Amplifier 30 is current $I_L$. The value of current $I_L$ is given by the following equation:

$$I_L = A_I(I_X) = A_I(I_K - \frac{V_L}{R_8}). \quad (4)$$

Since current $I_L$ is also equal to $V_L/R_L$, current $I_L$ can be rewritten as follows:

$$I_L = A_I(I_K - \frac{I_L R_L}{R_8}). \quad (5)$$

Collecting $I_L$ on the left side of equation (5) leads to the following result:

$$I_L(1 + \frac{A_I R_L}{R_8}) = A_I I_K. \quad (6)$$

This equation may be rewritten as:

$$I_L = \frac{A_I I_K}{(1 + \frac{A_I R_L}{R_8})} = \frac{I_K R_8}{(\frac{R_8}{A_I} + R_L)}. \quad (7)$$

If $I_K R_8$ is set to be equal to $V_{BATT}$ and if $R_8/A_I$ is then set to be equal to $R_F$ then:

$$I_L = \frac{V_{BATT}}{(R_F + R_L)}. \quad (8)$$

As can be seen, this $I_L$ function is the same as that developed by the circuit shown in FIG. 2. Since it is desired that resistance $R_F$ have a value of 400 ohms, for a given $A_I$, resistor $R_8$ is defined as:

$$R_8 = R_F A_I = 400 A_I. \quad (9)$$

Once resistor $R_8$ has been chosen, the value of current $I_K$ is defined as:

$$I_K = \frac{V_{BATT}}{R_8} = \frac{-48 \text{ volts}}{400 A_I}. \quad (10)$$

Once resistance $R_8$ and current $I_K$ have been defined, the circuit shown functionally in FIG. 5 exhibits the same DC characteristics as the circuit shown in FIGS. 2 and 3.

Figure 6:
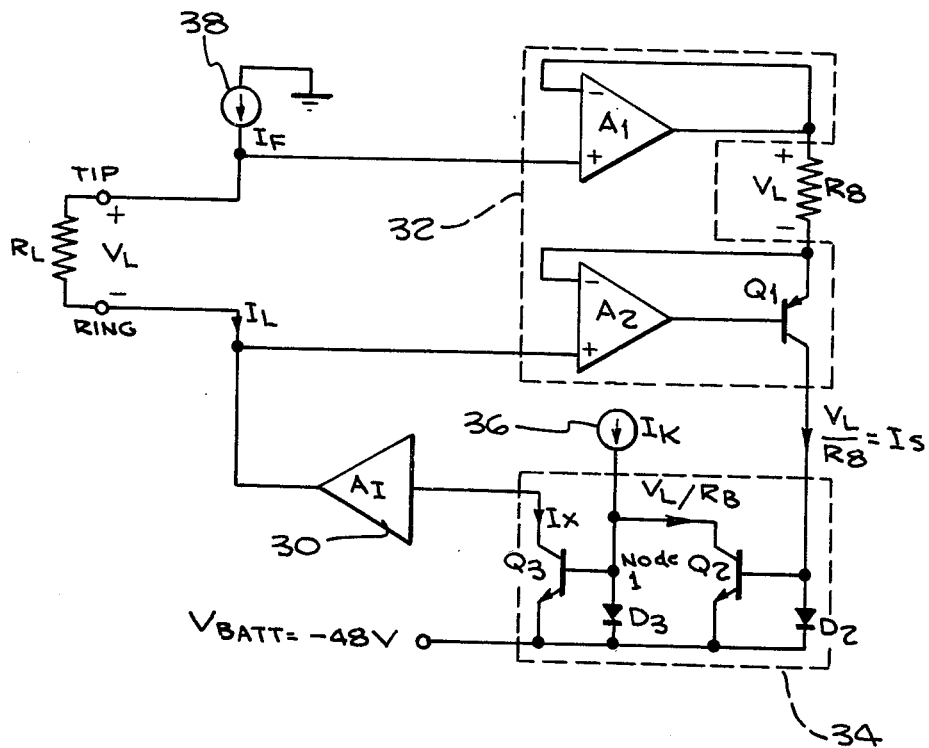
FIG. 6 is a schematic diagram showing an implementation of the block diagram shown in FIG. 5.

FIG. 6 shows an implementation of the functional block diagram shown in FIG. 5. The basic principle of operation the circuit, as is the case for the circuit shown in FIG. 5, is to sense the value of the voltage across resistance $R_L$, and to use its value to control the operation of a current generator in series with resistance $R_L$. In FIG. 6, the voltage $V_L$ across resistor $R_L$ is transferred by the Voltage Sense and Transfer Circuit 32 across resistor $R_8$.

The Voltage Sense and Transfer Circuit 32 comprises two operational amplifiers $A_1$ and $A_2$, each configured as a unity voltage gain buffer. A unity voltage gain buffer exhibits high input impedance and low output impedance and consequently only a negligible current flows into the (+) terminals of amplifiers $A_1$ and $A_2$ away from resistor $R_L$. The current developed through resistor $R_8$ is thus equal to $V_L/R_8$. This current passes through transistor $Q_1$ into the Current Subtractor Circuit 34.

As shown in FIG. 6, the Current Subtractor Circuit 34 utilizes two current mirror circuits, one containing diode $D_2$ and transistor $Q_2$, and one containing diode $D_3$ and transistor $Q_3$. In a current mirror a current flowing into the common node between the transistor and the diode causes an equal current to flow into the collector of the transistor. For example, regarding the current mirror formed by diode $D_2$ and transistor $Q_2$, when current $V_L/R_8$ flows into the junction to which the base of transistor $Q_2$ and the anode of diode $D_2$ are connected, an equal current $V_L/R_8$ is caused to flow into the collector of transistor $Q_2$. Thus, the current on the diode $D_2$ side of the current mirror is "mirrored" on the transistor $Q_2$ side.

Regarding the current mirror formed by transistor $Q_3$ and diode $D_3$, the current flowing into node 1 is the difference between the current $I_K$ from the $I_K$ current source 36 and the current $V_L/R_8$ flowing into the collector of transistor $Q_2$. This difference current is mirrored into the collector of $Q_3$ and the resulting current is designed $I_X \cdot I_X$ is given by the following equation:

$$I_X = I_K - (V_L/R_8). \quad (11)$$

Regarding the construction of the current mirrors, the diode in each mirror is actually a transistor whose base and collector regions are electrically connected together. Additionally, the emitter region of that transistor is identical to the emitter region of the transistor which forms the diode. For example, transistor $Q_2$ has an identical emitter region to the transistor forming diode $D_2$. By varying the ratios of the emitter areas of the transistors, the relative amount of mirroring between the two elements can be controlled. Current mirrors are frequently utilized in integrated circuit fabrication to control the relative amount of current flowing in a given circuit path.

As discussed above, two current mirrors can be configured to form a current subtracting circuit. Although other circuit configurations could be utilized in this invention, the current subtracting function, for purposes of integrated circuit fabrication, is most easily implemented with the dual current mirror configuration discussed.

Current $I_X$ is amplified by a Current Amplifier Circuit 30. Typical current amplifier circuits are shown in FIGS. 7(a) and 7(b). Both circuits utilize a standard operational amplifier $A_V$, a pair of biasing resistors ($R_B$ and $R_C$ in FIG. 7(a) and $R_E$ and $R_F$ in FIG. 7(b)) and an output transistor ($Q_{38}$ in FIG. 7(a) and $Q_{30}$ in FIG. 7(b)). The theory of operation of each of the circuits is to use the high voltage gain of the operational amplifier $A_V$ to force a current through the transistor determined by the ratio of the values of the resistor in the feedback path. The transistor either sinks (FIG. 7(b)) or sources (FIG. 7(a)) current as required. By having a much larger but exactly determined current flow, the circuit exhibits a large and exactly determined current gain, a characteristic not easily obtained. In particular, the operation of the current amplifier circuits of FIG. 7(a) and FIG. 7(b) may be easily understood by examining FIG. 7(a). In this circuit, the current $I_{IN}$ flows mostly through resistor $R_B$, since the operational amplifier $A_V$ draws little current. Thus a voltage VRB is developed across resistor $R_B$. The negative feedback of the operational amplifier $A_V$ forces transistor $Q_{38}$ to conduct enough current through resistor $R_C$ to make VRC equal VRB. By setting $R_C$ to be a small fraction of $R_B$, a current equal to the inverse of that fraction is forced through transistor $Q_{38}$, and hence, a current gain is realized depending on the ratio of the values of the resistors $R_B$ and $R_C$. Additionally, the high gain of the operational amplifier and the negative feedback make the circuit appear to have high output impedance. The output impedance is equal to that of the source of input current degraded by the realized current gain.

The emitters of the transistors $Q_{30}$ and $Q_{38}$ in FIGS. 7(b) and 7(a) are connected to the appropriate supply voltage. Accordingly, given the direction of the current shown in FIG. 7(a) the emitter lead would be connected to a positive supply voltage, and, given the direction of the current in FIG. 7(b), the emitter of transistor $Q_{30}$ would be connected to a negative supply voltage.

The current amplifier circuit of FIG. 7(b), which is the same as the current amplifier 30 of FIG. 6 because of the current direction therethrough, operates in a similar manner. In FIG. 7(b), an operational amplifier $A_V$ is utilized with two resistors $R_E$ and $R_F$ in a configuration in which the gain $A_I$ of the circuit is given by the following equation:

$$A_I = \frac{I_{out}}{I_{in}} = 1 + \frac{R_F}{R_E}. \quad (12)$$

Thus, with respect to FIG. 6, the current $I_L$ is amplified current $I_X$ and is given by the following equation:

$$I_L = A_I(I_K - \frac{V_L}{R_8}) = A_I(I_K - \frac{I_L R_L}{R_8}). \quad (13)$$

When this equation is rearranged such that $I_L$ is entirely on the left side of the equation, the following result is obtained:

$$I_L = \frac{A_I I_K}{(1 + \frac{A_I R_L}{R_8})} = \frac{I_K R_8}{(\frac{R_8}{A_I} + R_L)} \quad (14)$$

As before, if $I_K R_8$ is set to $V_{BATT}$ and $R_8/A_I$ is set to $R_F$, current $I_L$ is defined as:

$$I_L = \frac{V_{BATT}}{R_F + R_L} \quad (15)$$

This result is identical to the result obtained with the functional diagram shown in FIG. 5. Consequently, the circuit shown in FIG. 6 exhibits the current versus resistance characteristic shown in FIG. 4.

In FIG. 6, a controlled Current Generator 38, which generates current $I_F$, is utilized to generate a current which follows the DC value of current $I_L$. The voltage $V_L$ across resistor $R_L$ is the difference between two voltages, referred to as the tip voltage and the ring voltage. The tip voltage is the voltage from the top of resistor $R_L$ to electrical ground, and the ring voltage is the voltage from the lower end of $R_L$ to the battery voltage. The $I_F$ Current Generator 38 is necessary to ensure that the tip voltage constantly tracks the ring voltage, and thereby ensures that the mathematical equations representing the currents at various points in the circuit are correct. Without the $I_F$ Current Generator 38, it is possible that current amplifier $A_I$ may not supply enough current to ensure that $I_L$ is always a given magnification of current $I_X$.

With the circuit shown in FIG. 6, it is possible to simulate other DC current versus resistance characteristics by changing the amount of current produced by the $I_K$ Constant Current Generator 36, by changing the value of resistor $R_8$, or by changing the amplification factor of the Current Amplifier Circuit 30. Similarly, if a positive instead of negative $V_{BATT}$ is utilized, the circuit in FIG. 6 can be made to operate with $Q_2$ and $Q_3$ as PNP transistors, instead of the NPN transistors shown.

Figure 8:
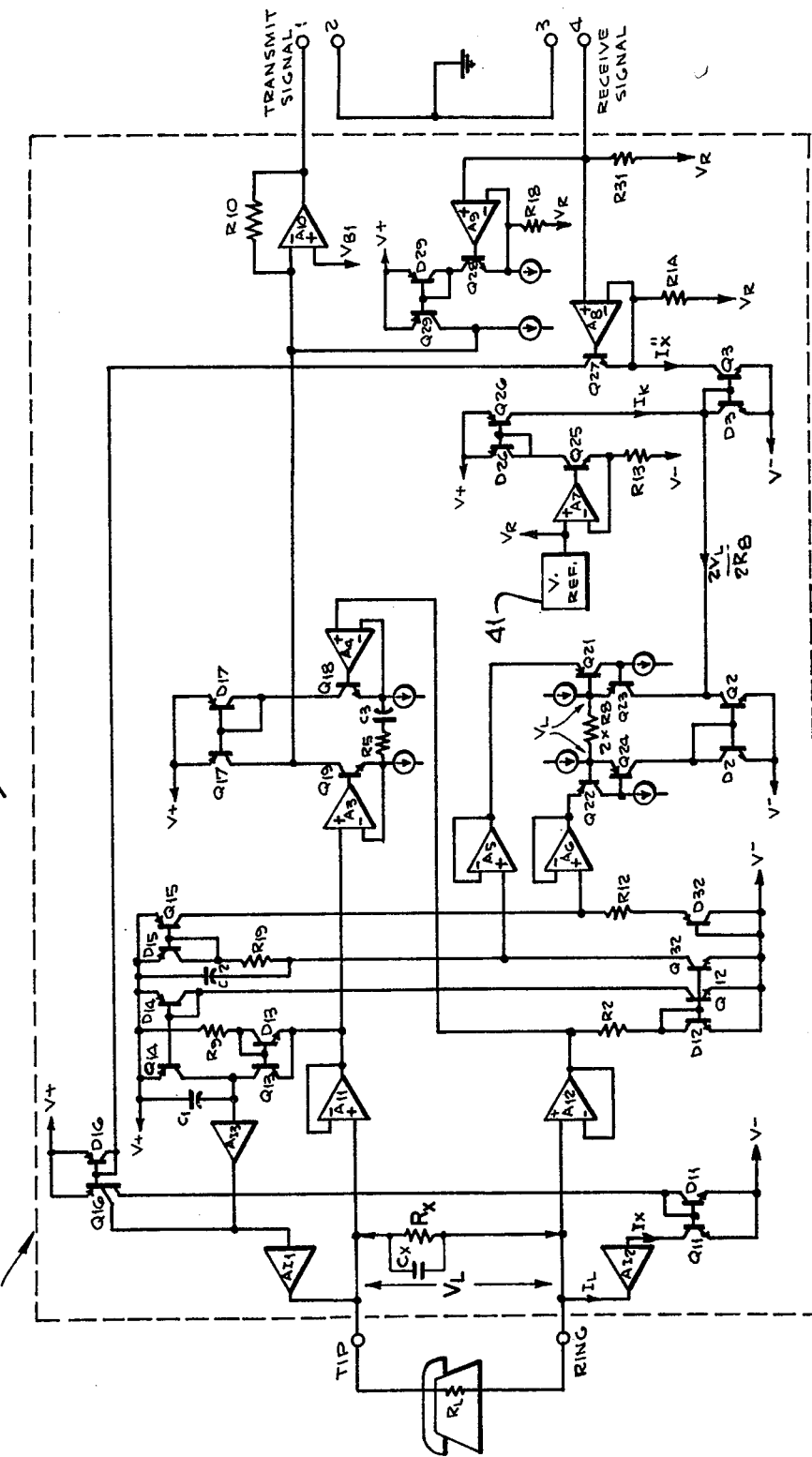
FIG. 8 is a schematic diagram of an integrated circuit which replaces the magnetic hybrid transformer shown in FIG. 2.

FIG. 8 shows an integrated circuit 50 implementation of a circuit which performs all of the functions of the magnetic hybrid transformer shown in FIG. 2. Certain components $C_x$, $R_x$, $C_1$, $C_2$ and $C_3$ in FIG. 8 are external of the integrated portion of the circuit 50 to allow their values to be tailored to specific applications. The integrated circuit with its external components 50 performs all of the functions of the MHT 40, the battery feed function is necessarily embedded into those portions of the circuit which perform the 2:4 wire conversion and which develop the AC impedance characteristics of the circuit. Accordingly, because of this embedding of one function within another occasioned by a practical realization of a completely electronic substitute for the MHT, there is not as complete a functional delineation between the various circuit elements in FIG. 8 vis-a-vis FIG. 6 as would otherwise be desired. The basic invention shown diagrammatically in FIG. 5 and schematically in FIG. 6 may be implemented in a variety of forms in any type of electronic circuitry. Also, as the invention deals solely with the battery feed portion of the circuit 40 shown in FIG. 8, the portions of that circuit 40 which perform the 2:4 wire conversion and which develop the appropriate AC impedance are discussed in somewhat summary form herein.

The circuit 50 shown in FIG. 8 is intended to be a direct replacement for the MHT 40 shown in FIG. 2. Consequently, terminals 1 through 4 of the circuit 50 of FIG. 8, as well as the ring and tip terminals, are connected to the same point in the system shown in FIG. 1 as are the corresponding terminals in the MHT 40 shown in FIG. 2.

Regarding FIG. 8, the voltage $V_L$ across resistor $R_L$ is again the difference between the tip and ring voltages. The tip voltage is the voltage from the top of resistor $R_L$ to the V+ supply voltage and the ring voltage is the voltage from the lower portion of resistor $R_L$ to the V− supply voltage. The V+ supply voltage, which is the same as ground, and the V− supply voltage, which is the same as the battery voltage in FIGS. 3 and 6, are utilized to energize the various active elements in the circuit 50 shown in FIG. 8. The $I_F$ Current Generator 38 in FIG. 6 is, in FIG. 8, realized by operational amplifier $A_{11}$, current amplifiers $A_{I1}$ and $A_{I3}$, transistors $Q_{12}$, $Q_{13}$ and $Q_{14}$, by diodes $D_{12}$, $D_{13}$, and $D_{14}$, and by resistors $R_2$ and $R_9$. The ring voltage across resistor $R_2$ is compared to the tip voltage across resistor $R_9$ by passing the currents through resistors $R_2$ and $R_9$ through diode $D_{12}$ and transistor $Q_{12}$, and through diode $D_{14}$ and transistor $Q_{14}$, respectively. Current amplifiers $A_{I1}$ and $A_{I3}$ force the tip voltage to track the ring voltage in a manner that the difference between the ring voltage and V− supply voltage is equal to the difference between the tip voltage and V+ supply voltage. In FIG. 8, the current amplifier $A_{11}$ is similar to the current amplifier circuit shown in FIG. 7(a).

Amplifiers $A_{11}$ and $A_{12}$ shown in FIG. 8 do not correspond to the unity voltage gain buffers $A_1$ and $A_2$ shown in FIG. 6. The function of amplifiers $A_{11}$ and $A_{12}$ in FIG. 8 is to provide the necessary current to the remainder of the circuit 50 without loading the tip and ring lines.

Unity voltage gain buffer $A_1$ of FIG. 6 approximately corresponds to amplifier $A_5$, and to transistors $Q_{21}$ and $Q_{23}$ and their associated current sources in FIG. 8. Similarly, unity voltage gain buffer $A_2$ in FIG. 6 approximately corresponds to amplifiers $A_6$, and to transistors $Q_{22}$ and $Q_{24}$ and their associated current sources shown in FIG. 8. Amplifiers $A_5$ and $A_6$ in FIG. 8 are both operational amplifiers which utilize the same construction as the other operational amplifiers in FIG. 8.

The ring voltage, upon entering the circuit shown in FIG. 8, is transformed into a current across resistor $R_2$. This current is then mirrored through diode $D_{12}$ into transistor $Q_{32}$. The current from transistor $Q_{32}$ passes through resistor $R_{19}$. Capacitor $C_2$ filters out any AC voltage across resistor $R_{19}$, thereby leaving only a DC level. As the difference between the tip voltage and the V+ supply voltage is equal to the difference between the ring voltage and the V− supply voltage, the voltage developed across resistor $R_{19}$ is also the tip voltage. The current passing through resistor $R_{19}$ is mirrored by diode $D_{15}$ into transistor $Q_{15}$. This mirrored current then flows through resistor $R_{12}$, thereby creating an equivalent DC ring voltage. Operational amplifier $A_5$, which is configured as a unity gain voltage buffer, transfers the voltage from the lower end of resistor $R_{19}$ to transistor $Q_{21}$. Operational amplifier $A_6$, which is also configured as a unity gain voltage buffer, tansfers the voltage from the upper end of resistor $R_{12}$ to transistor $Q_{22}$. The end result is that the DC value of voltage $V_L$ is applied across resistor $R_8$. In the circuit 50 shown in FIG. 8, the $R_8$ resistor has a value of twice $R_8$, denoted "2×$R_8$." This value is necessary since the differential amplifier formed by transistors $Q_{23}$ and $Q_{24}$ has a current gain of two. Thus, when the differential output of transistors $Q_{23}$ and $Q_{24}$ is converted to a single-ended signal by transistor $Q_2$ and diode $D_2$, the resulting current has a value equal to $2V_L/2R_8$, which is the same as $V_L/R_8$, the desired value.

The $I_K$ current source 36 in FIG. 6 is implemented in FIG. 8 through the use of the indicated Voltage Reference block 41, along wih operational amplifier $A_7$, transistors $Q_{25}$ and $Q_{26}$ and diode $D_{26}$. The current $I_K$ from transistor $Q_{26}$ is the mirrored output of amplifier $A_7$ across transistor $Q_{25}$.

The differential-to-single-ended action of the current mirror formed by transistor $Q_2$ and diode $D_2$ subtracts a current equal to $V_L/R_8$ from current $I_K$. The resulting difference current $I_X''$ is mirrored through diode $D_3$ into transistor $Q_3$. The current mirror formed by diode $D_2$ and transistor $Q_2$ in FIG. 8 is the functional equivalent of the current mirror formed by diode $D_2$ and transistor $Q_2$ in FIG. 6; similarly, the current mirror formed by diode $D_3$ and transistor $Q_3$ in FIG. 8 is the functional equivalent of the current mirror formed by transistor $Q_3$ and diode $D_3$ in FIG. 6.

The difference current $I_X''$ between current $V_L/R_8$ and current $I_K$ passes through transistor $Q_{27}$ into diode $D_{16}$. Transistor $Q_{16}$ is configured so as to split the current mirrored into it from diode $D_{16}$. Consequently, half of the mirrored current passes from one of the collectors of transistor $Q_{16}$ into current amplifier $A_{I1}$, and the other half of the current, which is present in the other collector of transistor $Q_{16}$, passes into current amplifier $A_{I2}$ through the current mirror formed by diode $D_{11}$ and transistor $Q_{11}$. The final result is that the tip side of the line will source current $I_L$ and the ring side of the line will sink current $I_L$, thereby completing the loop with $R_L$. Current Amplifier $A_{I2}$ is similar to the current amplifier circuit shown in FIG. 7(b).

Regarding the 2:4 wire conversion aspect of the circuit shown in FIG 8, the processing of current $I_X''$ through transistor $Q_{27}$, allows it to be modulated by the receive signal across resistor $R_{1A}$ by means of operational amplifier $A_8$. This "receive" signal is then applied to the telephone lines. As the average value of the received signal is zero, it will not affect the DC value of $I_L$. Regarding the transmit signal, the AC signal across the tip and ring lines is applied across resistor $R_5$ by amplifiers $A_3$ and $A_4$ and by transistors $Q_{19}$ and $Q_{18}$. Transistor $Q_{17}$ and diode $D_{17}$ remove the biasing currents from this signal, and the resulting AC signal current is applied to operational amplifier $A_{10}$. This amplified transmit signal is then sent out of the circuit 50 through the transmit signal line.

As the AC signal across the tip and ring lines, as well as the AC current from transistors $Q_{17}$ and $Q_{19}$, contains both the receive and transmit signal, a receive current equal and opposite to the received signal is generated and summed in at the input of $A_{10}$ to cancel the received signal. Amplifier $A_9$, transistors $Q_{28}$ and $Q_{29}$, diode $D_{29}$, and resistor $R_{1B}$ are configured so as to generate such a signal to be added to the signal across resistor $R_5$ as it is applied to amplifier $A_{10}$. Consequently, the transmit signal leaving the circuit 50 is separated from the receive signal. This action is functionally identical to the action of the MHT 40 in performing the 2:4 wire conversion.

Regarding the AC impedance characteristics of the MHT 40, these can be determined in the circuit 50 shown in FIG. 8 by the use of the external resistor $R_X$ and the external capacitor $C_X$ at the input of the circuit 50. The configuration of resistor $R_X$ and capacitor $C_X$ will allow either the 600 or 900 ohm standard impedance of the telephone system to be easily achieved. However, as stated, it is only the battery feed portion of the circuit shown in FIG. 8 which is claimed as the invention and the other functions of the circuit shown in FIG. 8 are included only for completeness as the circuit 50 in FIG. 8 is intended to be a complete replacement for the MHT 40.

FIG. 9 shows the insertion of a loop extender circuit 28 into the telephone system block diagram shown in FIG. 1. A loop extender circuit is an amplifier inserted between the hybrid 22 and the telephone 20 to boost the current output of the hybrid 22 in order to allow it to drive and detect telephone conversations occurring at great distances from the Central Office. A loop extender uses the DC current present on the telephone line to sense the degree of amplification (AC signal gain) required.

A MHT is not affected by having a loop extender circuit connected to it. However, previous attempts to use an active circuit replacement for the MHT have met with failure because their operation was not compatible with that of a loop extender. These previous attempts used a constant current type feed, whereby a constant current was applied to the telephone line. With this configuration, the loop extender appeared as a fixed length telephone line and the important current versus resistance characteristic shown in FIG. 4 was lost. By contrast, the present invention, which uses a quasi-resistive method of feeding the telephone line preserves the current versus resistance characteristic shown in FIG. 4 even when a loop extender is utilized with it.

In the foregoing description of the present invention, a preferred embodiment of the invention has been disclosed. It is to be understood that other design variations are within the scope of the present invention. Thus, by way of example and not of limitation, other means could be used to sense the voltage across the subscriber loop and to develop the control current proportional to the sensed voltage; the current amplifier could be implemented with an operational amplifier configured differently than as depicted and a different circuitry configuration could be used for the current subtractor. Accordingly, the invention is not limited to the particular arrangement which is illustrated and described in detail.

What is claimed is:

1. In an electronic circuit for replacing the hybrid transformer portion of the telephone system call-handling equipment, an electronic circuit for simulating the direct current characteristics of said transformer, comprising:

current amplifier means for supplying a loop current to a telephone subscriber loop;

voltage sensing means, connected across said subscriber loop, for sensing the voltage across said subscriber loop and for transferring said sensed voltage across a reference resistor, thereby developing a reference current through said resistor which is proportional to the voltage across said subscriber loop;

current generator means for supplying a current of constant value; and current subtractor means, connected between the outputs of said voltage sensing means and said current generator means and the input of said current amplifier means, for subtracting said constant current from said reference current, the resulting current forming the input current to said current amplifier means, said current amplifier means thereby producing an amplified current proportional to the reciprocal of a constant resistance plus the resistance of said subscriber loop.

2. A circuit for simulating the direct current characteristics of a hybrid transformer as defined in claim 1, wherein said voltage sensing means comprises:

two unity gain voltage buffer means, each exhibiting a high input impedance and a low output impedance, the inputs of said buffer means connecting to opposite sides of said subscriber loop, and the voltage across said subscriber loop appearing at the outputs of said buffer means; and said reference resistor connected between the outputs of said buffer means, said resistor thereby having the voltage across said subscriber loop applied across it, said voltage causing a current to flow through said resistor proportional in value to the voltage across said subscriber loop.

3. A circuit for simulating the direct current characteristics of a hybrid transformer as defined in claim 1, wherein said current subtractor means comprises:

a pair of current mirror means, each comprising
a first transistor;
a second transistor sharing a common base with said first transistor, said second transistor having its base and collector electrically connected whereby said second transistor is functionally a diode, said second transistor also having its emitter connected to the emitter of said first transistor, the configuration of said first transistor with said second transistor thereby producing a circuit wherein a current directed into the base of said second transistor causes a current proportional to the emitter area ratio between said first transistor and said second transistor to be induced into the collector of said first transistor;

means for routing said reference current produced by said voltage sensing means into the base connection of the second transistor portion of the first of said current mirrors;

means for connecting the collector of the first transistor portion of said first current mirror to the base of the second transistor portion of the second of said current mirrors and to the reference current produced by said voltage sensing means;

means for interconnecting the emitters of all aforesaid transistors;

means for connecting the output of said current generator means to the interconnection point of both of said current mirrors, said interconnection point thereby containing the current which is the difference between said reference current and the current produced by said current generator means; and means for connecting the collector of the first transistor portion of said second current mirror to the current amplifier means, the current in said collector being said difference current, said difference current when amplified resulting in an amplified current proportional to the reciprocal of a constant resistance plus the resistance of said subscriber loop.

4. A circuit for simulating the direct current characteristics of a hybrid transformer as defined in claim 1, wherein said circuit further comprises:

controlled current generator means, connected to the opposite side of said subscriber loop as said current amplifier means, for injecting a current into said loop; and means for controlling said controlled current generator means, whereby said injected current causes the voltage present at one side of the loop to track the voltage present at the other side of the loop.

5. An electronic circuit for simulating the direct current characteristics of a hybrid transformer as defined in claim 1, wherein said current amplifier means comprises:

operational amplifier means for providing amplification of the current produced by said subtractor means, said operational amplifier means including an inverting input and a non-inverting input;

transistor means, connected to the output of said operational amplifier means, for routing the output from said operational amplifier means to said non-inverting input;

means for routing the current output from said subtractor means to said inverting input; and feedback resistor means, connected to said inverting input and said transistor means, for controlling the division of current between said operational amplifier means and said transistor means, whereby the current through said resistor means is a linearly amplified version of the current at said inverting input, said current through said resistor means forming the amplified output current from said current amplifier means to said subscriber loop.

6. An electronic circuit for simulating the direct current characteristics of a hybrid transformer as defined in claim 1, wherein said current generator means comprises:

voltage reference means for providing a fixed voltage;

operational amplifier means, connected to the output of said voltage reference means, for buffering the output of said voltage reference means;

transistor means, connected to the output of said operational amplifier means, for controlling the current output from said operational amplifier means in a manner in which said current output has a constant value; and current mirror means, connected to said transistor means, for modifying the magnitude of said constant current.

7. An electronic circuit for simulating the direct current characteristics of a telephone hybrid circuit and associated subscriber loop, said circuit being utilized in a circuit replacing said hybrid circuit and comprising:

means for supplying an adjustable loop current to a telephone subscriber loop;

means for sensing the voltage across the subscriber loop and for developing a control current proportional to the sensed voltage; and means for adjusting said loop current to be equal to a constant current reduced by said control current, to thereby force the loop current to be proportional to the reciprocal of a constant plus the loop resistance.

8. An electronic circuit as defined in claim 7 wherein:

said means for supplying an adjustable loop current to a telephone subscriber loop includes:
   current amplifier means;
(b) said sensing and developing means includes:
   (i) reference resistor means, and,
   (ii) voltage buffer means, connected across said subscriber loop, for transferring the voltage across said loop to said reference resistor means, thereby developing said control current through said resistor means which is proportional in value to the voltage across said subscriber loop;
(c) said means for adjusting said loop current includes:
   (i) current generator for supplying said constant current and,
   (ii) current subtractor means, connected to said reference resistor means and to the output of said current generator means and to the input of said current amplifier means, for subtracting said constant current from said control current, the resulting current forming the input current to said current amplifier means, said current amplifier means thereby producing an amplified current proportional to the reciprocal of a constant resistance plus the resistance of said subscriber loop; and
(d) said electronic circuit further includes controlled current generator means, connected to the opposite side of said subscriber loop as said current amplifier means, for injecting a current into said loop and means for controlling said controlled current generator means whereby said injected current causes the voltage present at one side of the loop to track the voltage present at the other side of the loop.

9. A telephone system including the electronic circuit of claims 1 or 7, further comprising:
   a subscriber loop including a telephone handset;
   loop extender circuit means, connected between said subscriber loop and said electronic circuit, for raising the level of the signal supplied to said subscriber loop by said electronic circuit; and
   telephone central office circuitry connected to said electronic circuit replacing said hybrid transformer.

* * * * *